United States Patent [19]

Tsinberg

[11] Patent Number: 4,794,447

[45] Date of Patent: Dec. 27, 1988

[54] METHOD AND APPARATUS FOR TRANSMITTING AND RECEIVING A HIGH DEFINITION NTSC COMPATIBLE TELEVISION SIGNAL OVER A SINGLE DBS CHANNEL IN TIME DIVISION MULTIPLEX FORM

[75] Inventor: Mikhail Tsinberg, Riverdale, N.Y.

[73] Assignee: North American Philips Corporation, New York, N.Y.

[21] Appl. No.: 931,756

[22] Filed: Nov. 17, 1986

[51] Int. Cl.[4] .................. H04N 11/18; H04N 7/12
[52] U.S. Cl. ............................. 358/14; 358/12; 358/141
[58] Field of Search ............... 358/12, 14, 15, 16, 358/141

[56] References Cited

U.S. PATENT DOCUMENTS

| | | | |
|---|---|---|---|
| 4,473,837 | 9/1984 | Tiemann | 358/134 |
| 4,476,484 | 10/1984 | Haskell | 358/16 |
| 4,485,401 | 11/1984 | Tan et al. | 358/12 |
| 4,521,803 | 6/1985 | Gittinger | 358/12 |
| 4,533,936 | 8/1985 | Tiemann et al. | 358/12 |
| 4,605,950 | 8/1986 | Goldberg et al. | 358/11 |
| 4,613,903 | 9/1986 | Nadan | 358/141 |
| 4,630,099 | 12/1986 | Rzeszewski | 358/12 |
| 4,633,295 | 12/1986 | Van de Polder et al. | 358/12 |
| 4,636,835 | 1/1987 | Tan et al. | 358/12 |
| 4,652,904 | 3/1987 | Van de Polder | 358/12 |
| 4,694,338 | 9/1987 | Tsinberg | 358/11 |

*Primary Examiner*—John W. Shepperd
*Attorney, Agent, or Firm*—Thomas A. Briody; Algy Tamoshunas; Marianne R. Rich

[57] ABSTRACT

A high definition television signal having 525 lines per frame, a sequential scan, and 59.94 frames per second is encoded into a time multiplex signal for transmission. The encoder drops alternate line, but creates line difference signals which allow reconstruction of the dropped lines at the receiver. The line difference signals are time compressed, while the luminance signals of the alternate, transmitted lines are time expanded. The encoder can accept programs from any one of a plurality of program originators, as long as the frame and line rates are multiples of one another. The time multiplex signal carries luminance and chrominance components in each line, but update signals such as high frequency luminance, high frequency chrominance and the line difference signals in a predetermined pattern in sequential frames. At the receiver, the time multiplex signal is decoded into the original high definition signal and is further encoded directly into two channels, the first being compatible with NTSC, the second being an augmentation channel. The two channels can latter be recombined, for example at a cable receiver, to create the high definition signal, while the first channel signal can be directly received on an NTSC receiver.

11 Claims, 13 Drawing Sheets

METHOD AND APPARATUS FOR TRANSMITTING AND RECEIVING A HIGH DEFINITION NTSC COMPATIBLE TELEVISION SIGNAL OVER A SINGLE DBS CHANNEL IN TIME DIVISION MULTIPLEX FORM

CROSS-REFERENCE TO RELATED APPLICATION AND PUBLICATIONS

U.S. Pat. No. 4,581,640;
U.S. Pat. No. 4,567,508; and
U.S. application Ser. No. 856,622, filed Apr. 25, 1956, by the same inventor and assigned to the same assignee as the present invention.

BACKGROUND OF THE INVENTION

1. Field of the Invention

The present invention relates to video signal transmission systems and, more particularly, to a one-channel transmission system adaptable to a number of formats.

2. Description of the Prior Art

There is presently known a two-channel MAC (multiplex analog component) CBS system for transmitting HDTV of the 1050, 2:1, 59.94 format. This is disclosed in U.S. Pat. No. 4,605,950. There is also a Japanese single channel system, known as the MUSE system and having a 1125, 2:1, 60 format. The MUSE system can accept only one format for transmission. It is based on horizontal, vertical, and temporal subsampling for both luma and chroma, and therefore requires full field memories in the receiver. It is further incompatible with NTSC both because of its 60 cycle (rather than 59.94 cycle) frame rate, and because it operates at 1150 lines per frame.

SUMMARY OF THE INVENTION

It is an object of the present invention to furnish a single channel transmission system which can accept at least two formats and yields a high quality picture at the receiving end. The system according to the present invention includes an HDTV-to-HDMAC encoder which can accept any format having a predetermined aspect ratio, a basic frame frequency or a multiple of that frame frequency, and a number of lines per frame equal to a given basic number or a multiple thereof. For the NTSC friendly embodiment illustrated in the present invention, the aspect ratio is 5.33:3, the frame frequency 29.97 or a multiple thereof, and the number of lines per frame is equal to 525 or a multiple thereof.

The transmission format changes with respect to the number of frames per second as required. For example, when the signal being transmitted is a television signal which has a high temporal refreshment rate, the frame frequency will be 59.94 frames per seconds. For telecine inputs, where little temporal resolution is involved (a 24 Hz sampling rate for motion picture film) the format according to the present invention is changed to a 29.97 Hz frame rate.

The present invention both as to its components and method of trassmission will best be understood from the following description taken in conjunction with the drawing.

DESCRIPTION OF THE PREFERRED EMBODIMENTS

Figure 1:
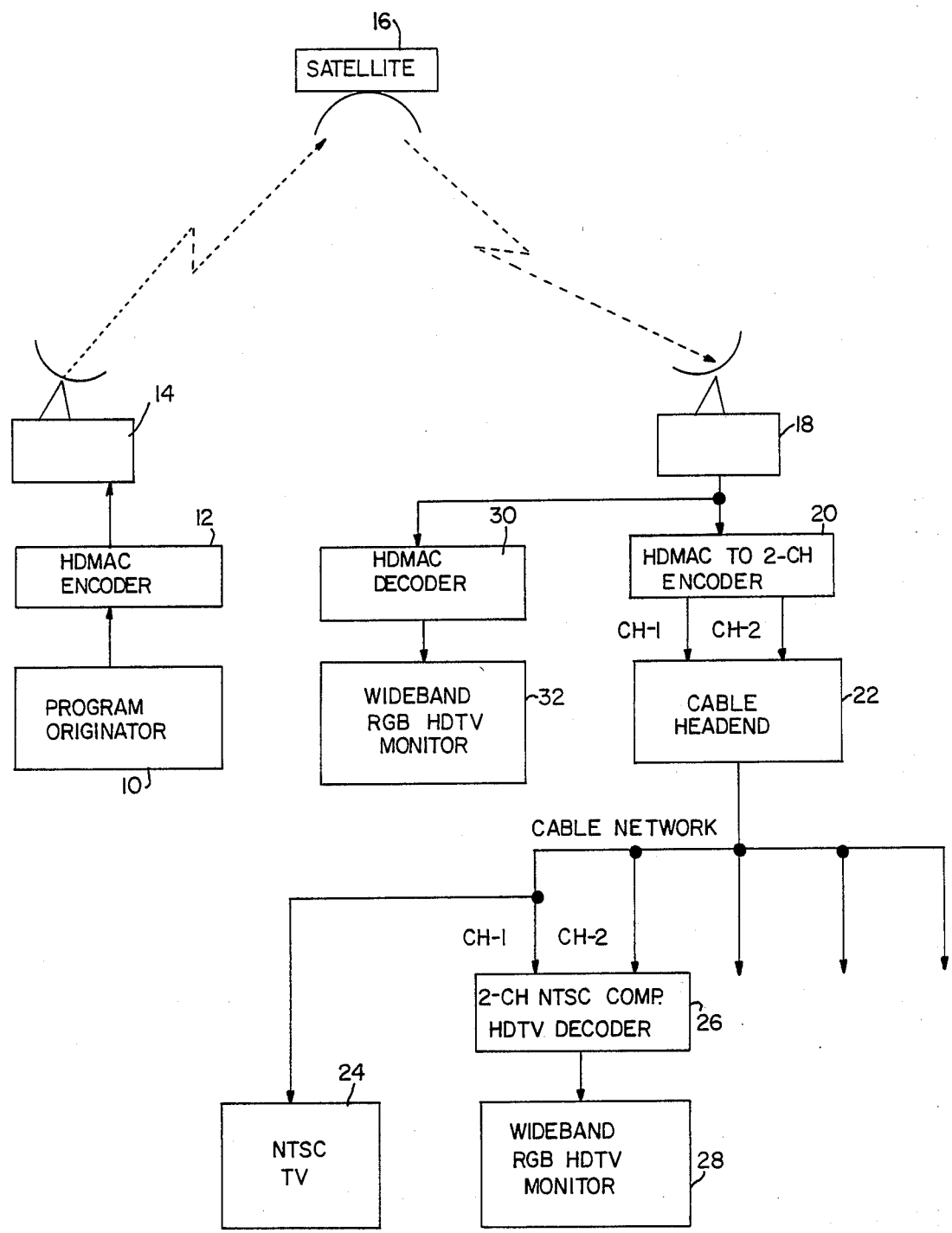
FIG. 1 is a block diagram illustrating the overall system and method according to the present invention.

The overall system is depicted in FIG. 1. The signal to be transmitted is supplied by a program originator 10. In the embodiment to be described, the one format generated by the program originator, is an NTSC compatible HDTV format as described in detail in copending application Serial No. 856,622, now U.S. Pat. No. 4,694,338 by the same inventor and assigned to the same assignee. The contents of this application are hereby incorporated by reference into the present application to be a part thereof. It should be understood that the system is not restricted to this format.

Figure 2:
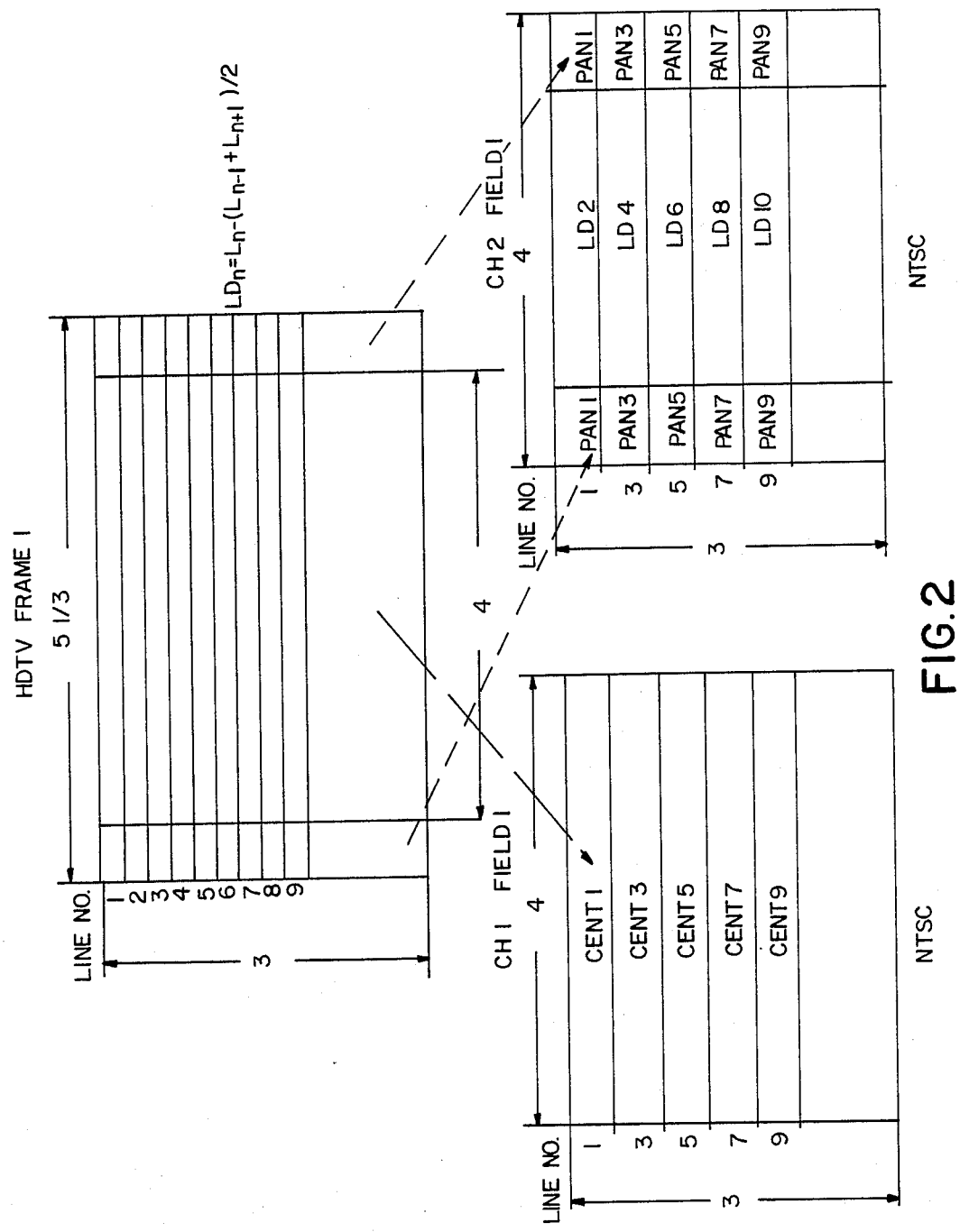
FIG. 2 is a schematic diagram illustrating frame 1 of an HDTV signal to be transmitted.
Figure 3:
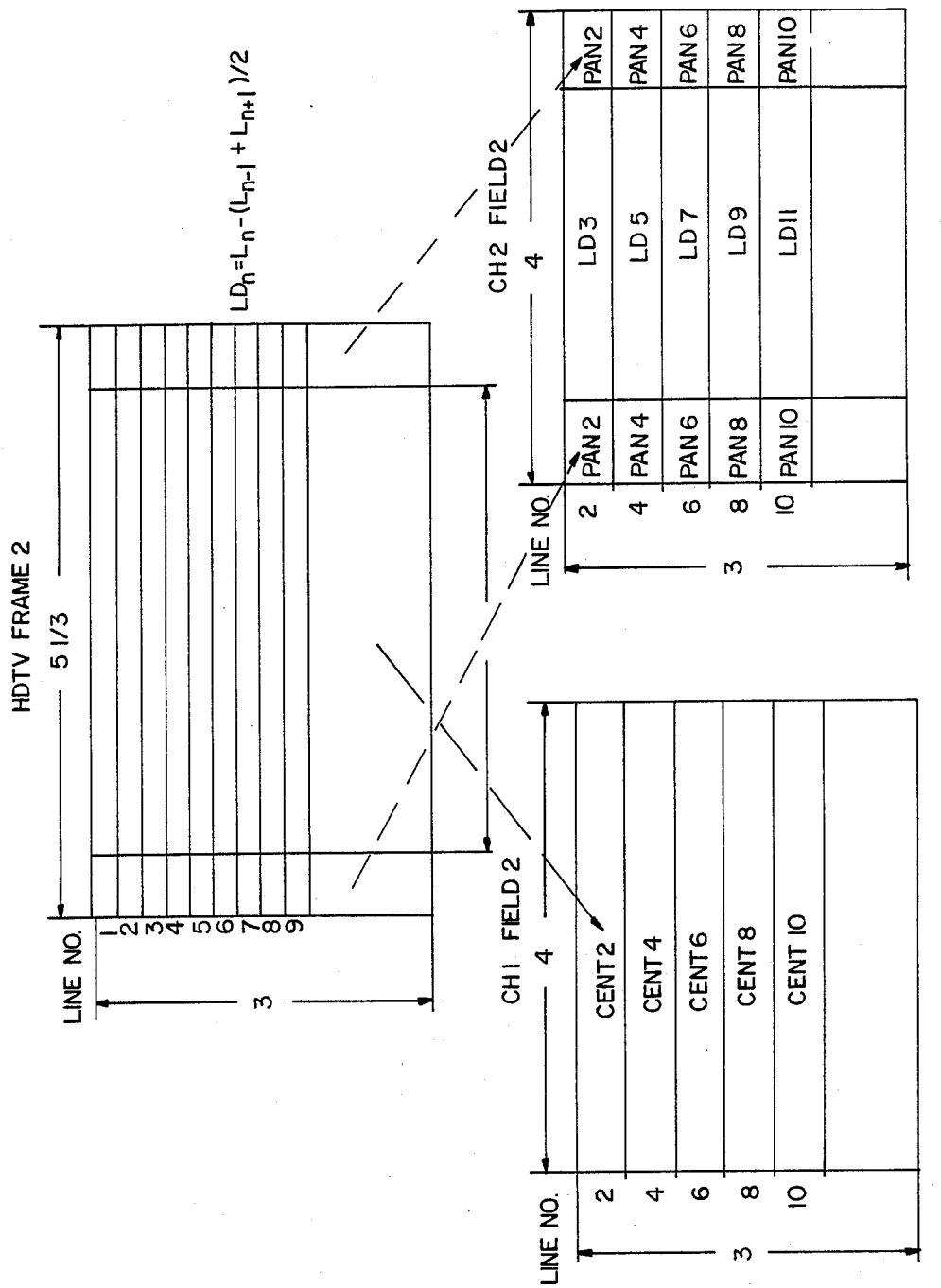
FIG. 3 is a schematic diagram illustrating frame 2 of an HDTV signal to be transmitted.

Briefly, the HDTV format illustrated in FIGS. 2 and 3 has a 5.33:3 aspect ratio. It is non-interlaced, has 525 lines per frame and a 59.94 frame frequency. In the known systems, the signal is transmitted over two channels. In the first channel, an NTSC compatible signal is transmitted. This signal has a 4:3 aspect ratio, i.e. only the central portion of the 5.33 width is used. Additionally, alternate lines are selected from each frame, yielding 265 lines per field, alternate fields being interlaced. In the second channel, lines omitted in the first channel are reproduced in full, while only the end portions of the selected lines are transmitted. At the receiving end, an HDTV receiver combines the input from the two channels to yield an HDTV picture. On the other hand, the data transmitted on the first channel is accepted by NTSC receivers and yields a standard picture.

The above-described HDTV signal is, as mentioned above, one input generated by the program originator. Movie film has high spatial resolution, but little temporal resolution. The present system can also accept an input having a format of 1050 lines per frame, using a one-to-one progressive scan at a 29.97 Hz frame rate, and having a 16:9 aspect ratio. The frame rate during transmission will conform to this lower frame rate.

Referring again to FIG. 1, the signal supplied by the program originator 10 is applied to an HDMAC encoder 12. The output of the HDMAC encoder will be transmitted via satellite on a single channel and utilizing a single satellite transponder. A signal beamed back to the ground to a dish 18 is applied to an HDMAC-totwo-channel encoder 20, the individual channels being applied to a cable headend 22. A first channel, channel 1, supplied by cable headend 22 is NTSC compatible and can be directly received by an NTSC television receiver 24. Receivers equipped with an HDTV decoder 26 can combine the input from the two channels and generate an HDTV picture on a wideband television receiver or monitor 28.

If the dish 18 at the receiving end is that of an individual having, for example, a dish in his back yard, the output of the dish will be applied to an HDMAC decoder 30 for viewing on a wideband RGB HDTV monitor 32. The output of the HDMAC decoder could have any of the following three formats in the illustrated embodiments. Other formats are possible.

1. 1050 line; 1:1 progressive; 59.94 refresh rate, 16/9 ratio
2. 1050 line, 2:1 interlace; 59.94 refresh rate, 16/9 ratio
3. 525 line 2:1 interlace; 59:94 refresh rate, 16/9 ratio.

The above described system will now be described in greater detail, starting at the transmitting end.

For those cases in which the original program is generated in an interlaced format, the format is changed to a sequential scan format prior to application to HDMAC encoder 12. Converters for this purpose are well-known and will not be described herein.

The output of the interlace-to-sequential signal converter is a TV signal having a format of 525 lines per frame, 59.94 refresh rate, sequential scan, and a 16/9 aspect ratio. A sequentially scanned signal is thus applied to HDMAC encoder 12, even when the originated program had an interlaced pattern.

Figure 4:
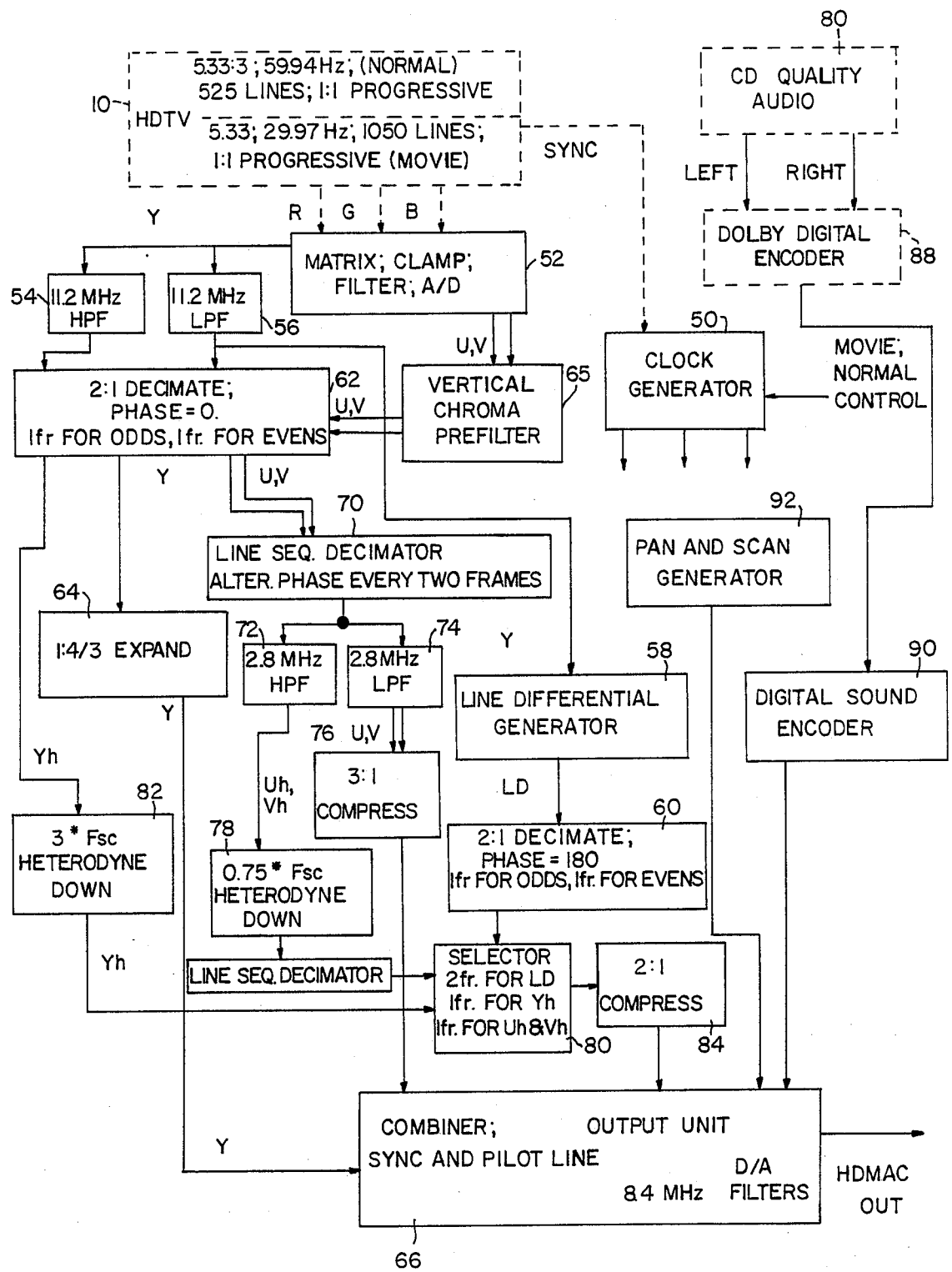
FIG. 4 is a schematic block diagram of the HDTV-to-HDMAC encoder.
Figure 5:
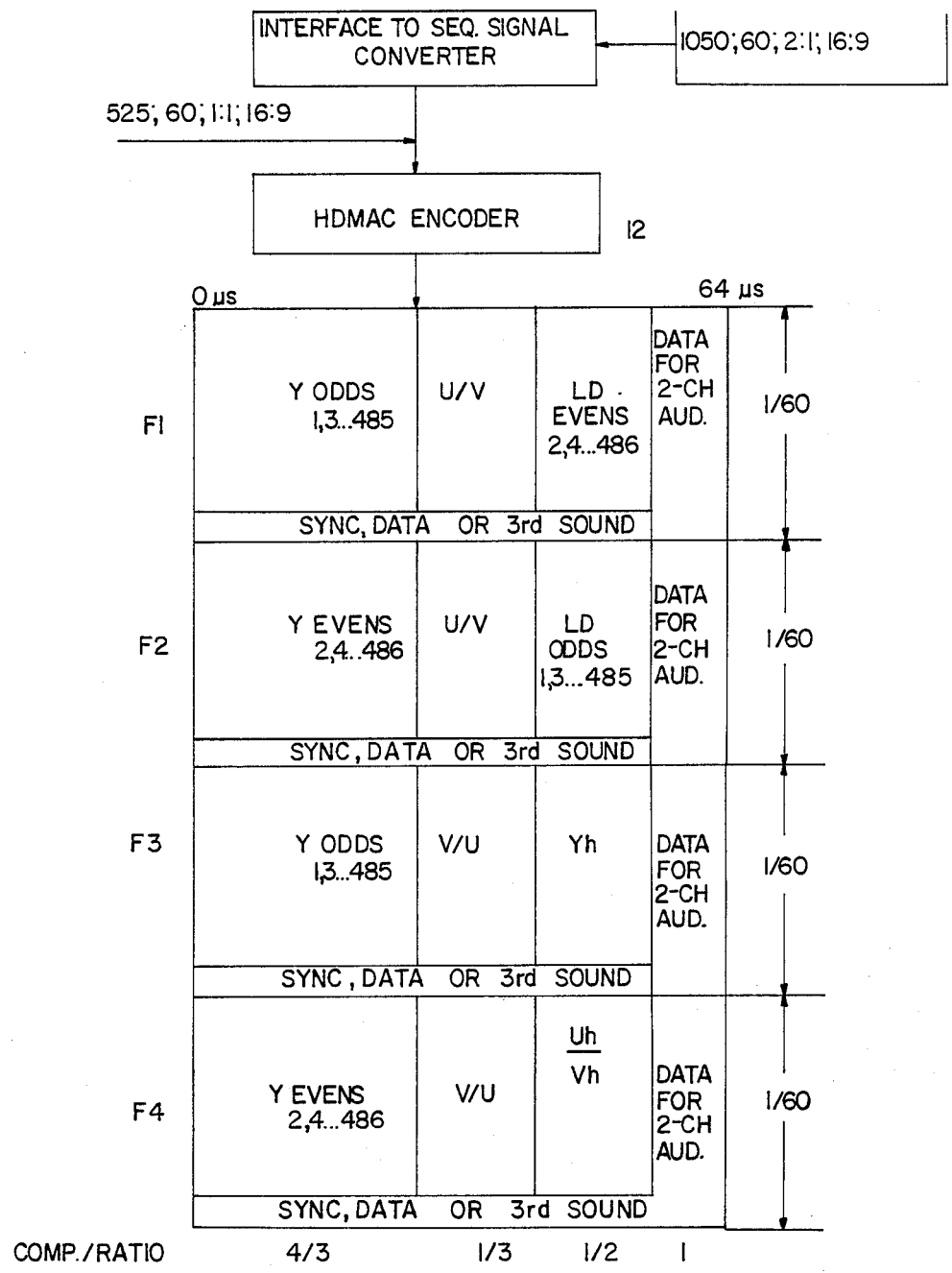
FIG. 5 illustrates the time frame format at the output of the HDMAC encoder for a TV signal input.
Figure 6:
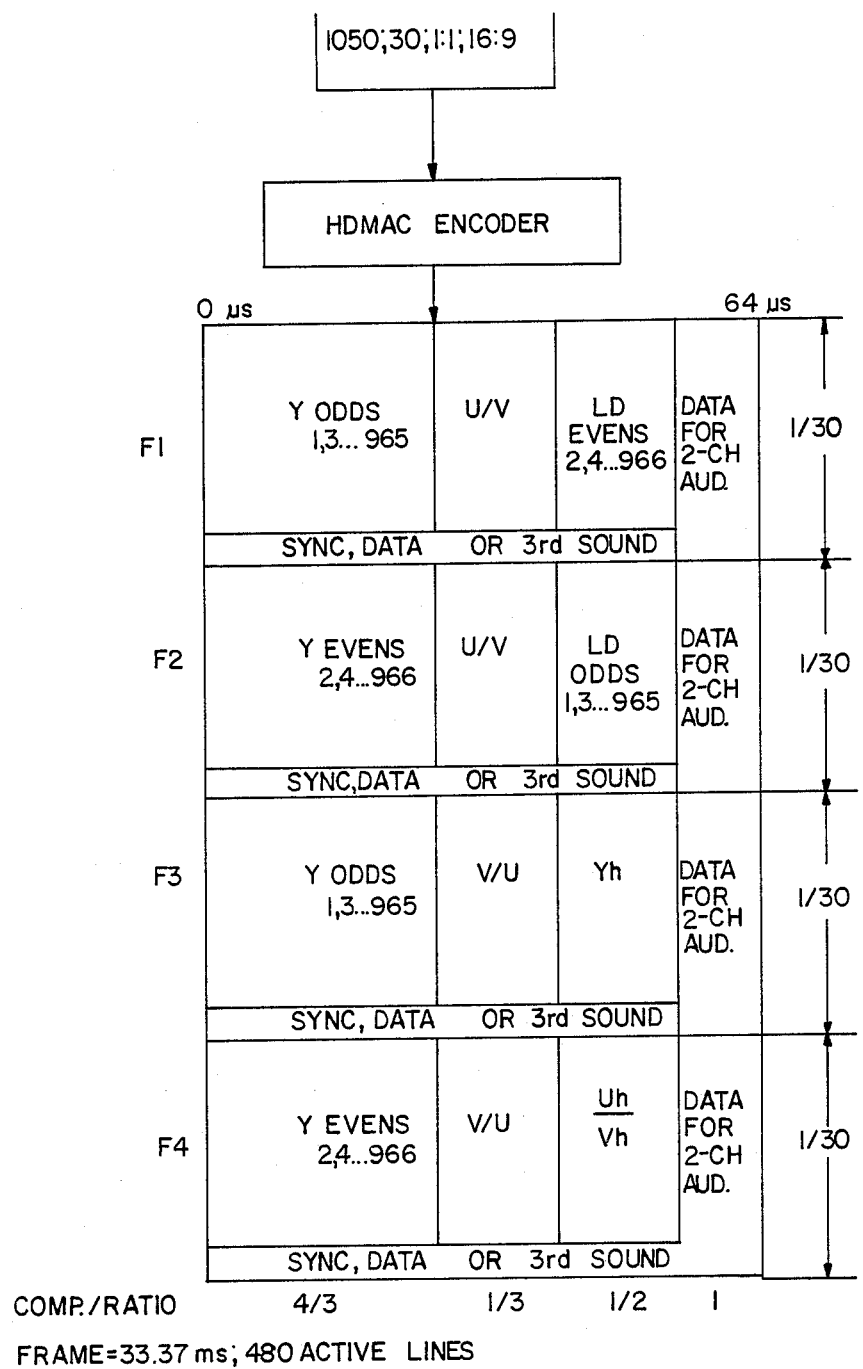
FIG. 6 illustrates the time frame format at the output of the HDMAC encoder for a telecine input.
Figure 7:
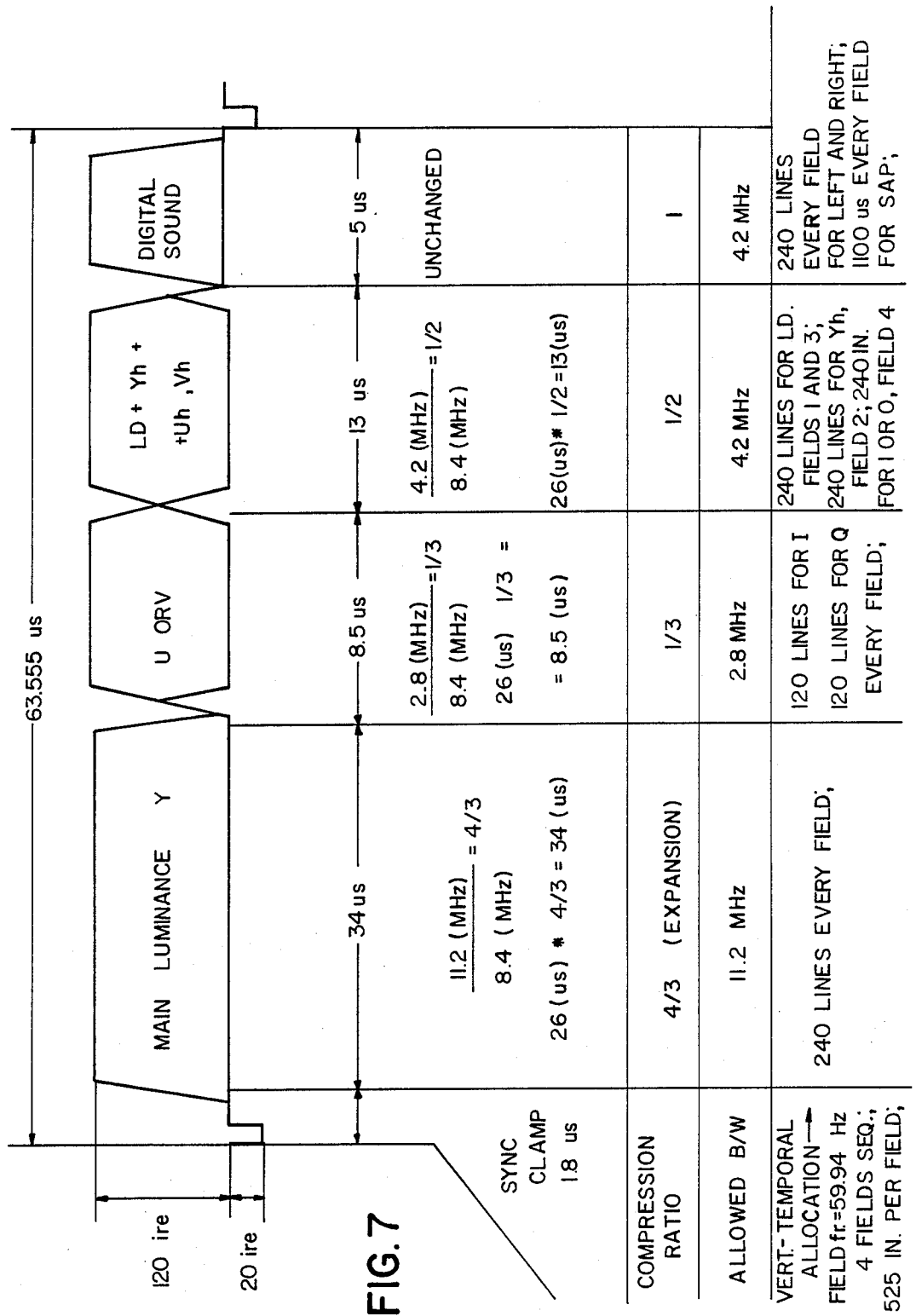
FIG. 7 illustrates the HDMAC signal format of a single line.

The object of the HDTV-to-HDMAC encoder illustrated in FIG. 4 is to furnish encode output signals having the time frame format illustrated in FIG. 5 upon receipt of a TV input, and a time frame format as illustrated in FIG. 6 upon receipt of a telecine input. In either case, the encoder output line frrmat will be the format illustrated in FIG. 7.

Figure 8:
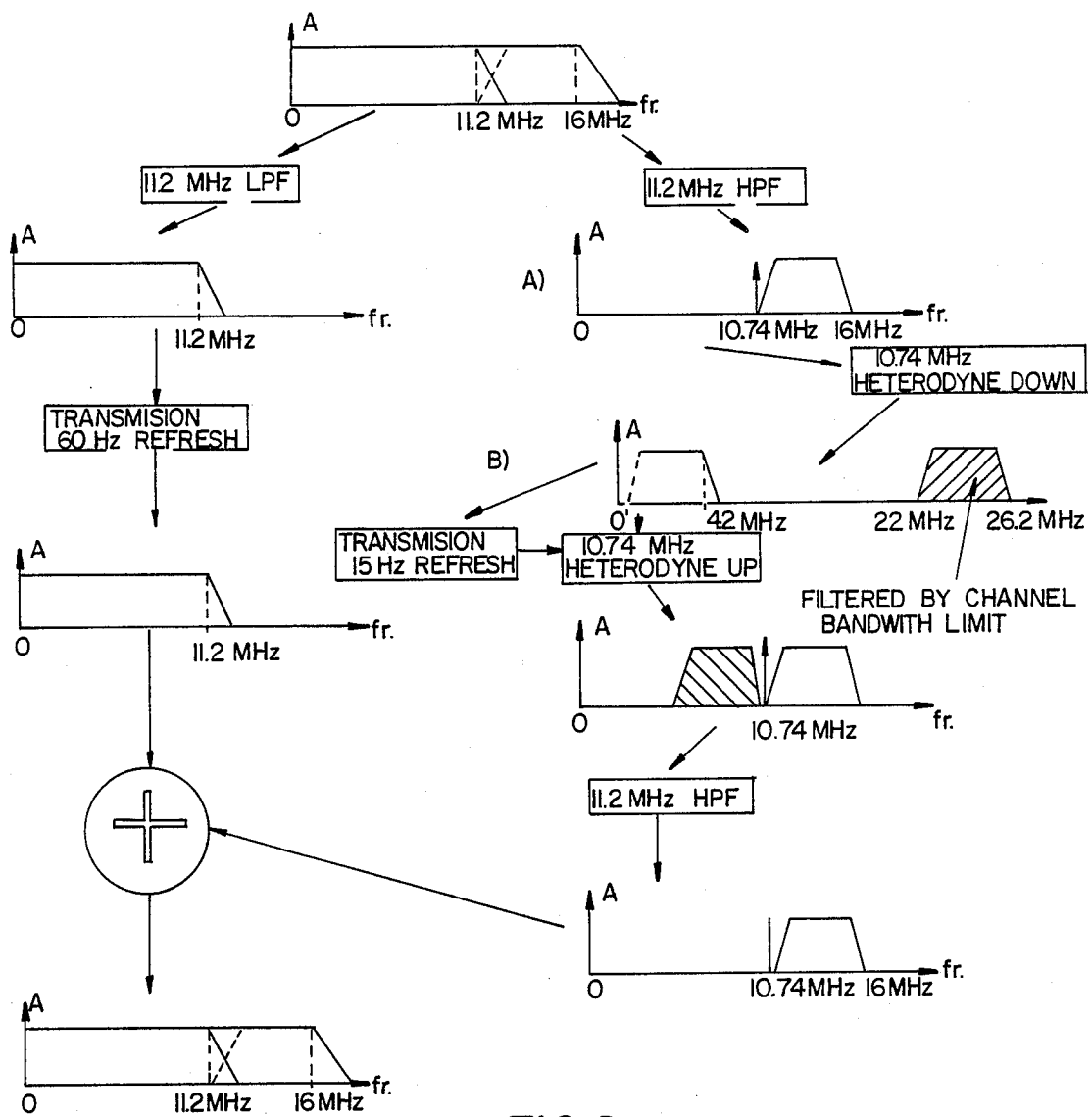
FIG. 8 is a diagram illustrating heterodyning of the high frequency luminance signal.

As shown in FIG. 8 each line contains luminance data, followed by chrominance data, followed by LD interpolation data and data for two-channel audio. Sync, data or third sound signals are carried in the vertical interval. It should be noted that all components constituting a line could of course be transmitted in a different order, e.g. the chrominance data could precede the luminance data, etc. Scrambling of the signal can be accomplished by changing the transmission order.

It is one of the functions of the HDTV-to-HDMAC encoder illustrated in FIG. 5 to expand the incoming luminance component, Y, in time from a line duration of 26 microseconds as received to the 34 microseconds to be occupied in the HDMAC signal format illustrated in FIG. 8. Further, the bandwidth of such an expanded signal must be less than 8.4 MHz, the bandwidths assigned to a satellite channel. Further, the encoder must compress the chrominance component to fit into the 8.5 microsecond time slots allocated in the HDMAC format. The updating and interpolating data to be furnished by the encoder must fit into an assigned time slot of 13 microseconds and have a bandwidth not exceeding 4.2 MHz. As noted in FIG. 8, digital sound can then be transmitted unchanged in the 5 microsecond slot still available.

Referring now to FIG. 5, four sequential frames are pictured at the output of HDMAC encoder 12. The time per frame is 1/60th of a second. (Actually 1/59.94 seconds, as required for the NTSC format. For convenience, this will be referred to as "1/60" herein.

In FIG. 5, as in FIG. 6, the time required for a line is indicated in the horizontal direction, while vertical time intervals are indicated in the vertical direction.

As illustrated in FIG. 5, the first frame, F1, contains luminance data from odd numbered lines between 1 and 485, i.e. there are 240 active lines per frame. Throughout the frame, the two chrominance components, indicated here as U and V, are transmitted alternately, one per line. It will be noted that the indicated sequence here is for the U component to precede the V component. This is referred to as 0 phase operation herein.

LD encoded data, i.e. data encoded in accordance with the equation:

$$LDn = Ln - (Ln-1 + Ln+1)/2$$

for even numbered lines is transmitted in the portion of each line following the chrominance component. Finally, the data on each line contains two-channel audio data.

The frame carrying only the odd line luminance data is followed by a frame F2 carrying the even line luminance data and LD interpolation for luminance data in the odd numbered lines. Second frame F2 also includes chrominance data, one component being transmitted per line, the U component still leading the V component. Two-channel audio data is again transmitted.

In frame 3, the luminance data associated with the odd numbered lines is again transmitted. The chrominance components are still transmitted with line alternation, one per line, but now the V component leads the U component. This is referred to as 180° phase operation herein. The interpolated luminance data is now replaced by data giving additional horizontal detail for the luminance component. Audio is transmitted in the same format as in the first two frames.

For the last frame, F4, even numbered luminance data is transmitted, followed by chrominance with the V component still leading the U component. The portion of the line originally including interpolated luminance data is now devoted to, on alternate lines, additional horizontal detail for the U component and additional horizontal detail for the V component. It will be noted that for a line on which the V component is being transmitted, the additional detail is furnished for the U component and vice versa. In the format shown in FIG. 5, the total time per frame is 16.68 milliseconds. The number of active lines per frame is 240.

For the HDMAC time frame for a telecine input, also referred to as Movie MAC, a similar format is used. (FIG. 6.) However, the time per frame here is 1/30th of a second (actually 1/29.94 seconds). The time for transmitting each frame is thus doubled relative to the format shown in FIG. 5. However, in frame 1 480 active lines are included as compared to the 240 active lines for each frame in FIG. 5. Telecine signals are thus transmitted at the lower time repetition rate, but with the greater vertical detail per frame that is appropriate for telecine transmissions.

The construction of the encoder required to effect the signal format change indicated in FIGS. 5 and 6 is shown in FIG. 4.

Program originator 10 furnishes either television signal output, as indicated above the dashed line, or telecine output as indicated below that line. The sync signal separated from either input is applied to a clock generator 50 which will control the frame refresh rate to be 1/60th of a second for television or 1/30th of a second for telecine input.

The RGB signals are applied to an input circuit 52 which consists of a matrix for generating the luminance and chrominance components from the incoming RGB signals a clamp (frame store), a filter nnd an analog-digital converter. All of these items are standard circuits which will not be described in detail here.

The luminance output generated in input circuit 52 is applied to a high pass filter 54 and a low pass filter 56. The output of low pass filter 56 is applied to a line differential (LD) generator 5B which performs the simple digital calculation illustrated in equation 1 above and in FIG. 2, on a pixel-by-pixel basis. Basically, for any given pixel value, the LD value to be transmitted is computed as the difference between the average value of the corresponding pixel in the preceding and following lines and the then-present pixel value.

The LD data calculated in line differential generator 58 is then separated into two sets of frame values, one frame for odd nmmbered lines, one frame for even numbered lines, in a decimator stage 60.

The output of low pass filter 56 is also applied to a two-to-one decimator stage 72, which separates the luminance data into one frame for odd numbered lines, one frame for even numbered lines. It should be noted that the decimator stages operate in opposite phase as indicated in FIG. 5.

The luminance data output of stage 62 is applied to a 1:4/3 expansion circuit 64. The output of expansion circuit 44 is applied to output stages here referred to jointly as output unit 66.

The chrominance outuut of input stage 52 is applied to a vertical chroma prefilter 68 whose output is applied to a second input of stage 62.

The chrominance output of stage 62 is applied to a 2:1 decimator circuit 70. In this circuit the phase of the two chrominance components, i.e. the association of a given component with either an odd or even luminance line is changed for every two frames.

The output of stage 70 is applied to a 3 MHz high pass filter 72 and a 3 MHz low pass filter 74. The output of the low pass filter is applied to a 3:1 compression circuit 76 whose output is in turn applied to output unit 66. The output of the high pass filter 72 yields additional horizontal chrominance detail. It is heterodyned downwards in a heterodyne stage 78, whose output is applied to a selector circuit 80.

Further inputs to selector stage 80 include the output of a second heterodyne stage 82 whose input is supplied by the output of high pass filter 54. Finally, a further input of selector circuit 80 receives the output of decimator circuit 60.

The output of selector circuit BO is applied to a 2:1 compression circuit 84 whose output is applied to output unit 66.

The audio, preferably of CD quality as indicated in an audio stage 86, is applied to an optional Dolby digital encoder 88 whose output is applied to a sound encoder 90. The output of sound encoder 90 is applied to output unit 66.

A pan and scan generator 92 is used to select the portion from HDTV frame 1 and 2 (FIGS. 2 and 3) which will constitute the NTSC signal. Its operation is known (see below) and will not be described here.

The operation of the encoder illustrated in FIG. 4 is as follows:

The operation will be described with reference to the "normal" source indicated at the top of input block 10 of FIG. 5, i.e. a source having 525 lines per frame, a 1:1 progressive scan, a 16/9 aspect ratio and a 59.94 Hz refresh rate. The incoming signals are R, G, and B signals and the associated synchronization signals. The matrix forms Y, U, and V signals by standard linear matrix transformation from the R, G and B signals. The Y, U and V signals must now be processed to achieve the line and frame structures illustrated in FIGS. 5, 6 and 7. The Y signal has a time duration of 26 microseconds per line. In order to generate the main luminance component for the line format of FIG. 7, Y signal is low pass filtered in filter 56. The signal at the output of filter 56 (low pass luminance signal) thus has an 11.2 MHz bandwidth. This signal is read out synchronously by a first switching circuit (not shown) in decimator stage 62. Only the odd numbered lines are read out for the first frame (FIG. 6), while the even numbered lines are read out for the subsequent frame. The signals read out from stage 62 are expanded in stage 64 in a 1:4/3 expansion circuit. The expansion circuits are well known in the art and consist, for example, of a storage or memory into which data is read at one rate and read out at another. The type of storage would be FIFO, i.e. first in, first out. The signals at the output of expansion unit 64 thus occur during a time period of 26 microseconds multiplied by 4/3 or 34 microseconds. The bandwidth has been compressed by the same factor and is now 8.4 MHz. This is the first signal applied to output unit 66.

Again referring to FIG. 7, the main luminance component is followed by a U or V chrominance component.

The signals U, V indicated at the output of input stage 52 are designated as digital signals, given the analog/digital converter in input stage 52. However they could equally well be analog signals. These U, V signals are subjected to vertical chroma prefiltering by a standard digital FIR filter. The output of the prefilter stage 65 are U, V signals having a 6.9 MHz bandwidth, and a 26 microsecond duration per line and 525 lines per frame. These signals are to be processed to produce the main U, V components having a bandwidth of 8.4 MHz, but a line duration of only 8½ microseconds as required in FIG. 7.

For the above mentioned purpose, the U, V components are also processed in decimator stage 62, alternate lines in each signal in each frame being dropped. The output of stage 62 is thus U and a V signal each having 263 lines per frame. Apparatus for dropping the alternate lines is a simple switch connection turned on an off in synchronism with the H sync pulses by the central control system. The latter is a microprocessor in the preferred embodiment.

The decimtted U and V outputs from stage 62 are next processed in decimating circuit 70. In decimating circuit 70, the color component-line association remains unchanged for the first two frames, and then is changed to the opposite phase, again by synchronously operating switches. Specifically, for faames 3 and 4 line 1 will be associated with the V signal, line 3 with a U signal, etc. The chrominance signals at the output of stage 70 thus follow the pattern indicated in FIG. 6. However, to generate the correct bandwidth and time duration for these signals, they are first applied to a low pass filter 74. The output of this low pass filter is limited to 2.8

MHz bandwidth. The so-limited signal is applied to a 3:1 time compression stage. This decreases the previously 26 microsecond duration to 8.5 microseconds and, simultaneously increases the bandwidth to 8.4 MHz. The output of 3:1 compression stage 76 thus consists of U, V components in the correct sequence and of the correct time duration, while the required bandwidth limit of 8.4 MHz is observed. The output of the stage is thus also connected to output unit 66 for combination with the processed luminance signals also applied to that unit.

It will be noted that the luminance and chrominance signals applied to output unit 66 have an information content that is decreased from that of the Y, U and V signals available at the output of the matrix in input unit 52. To compensate for this decrease in information, the HDMAC transmitted signal has a 13 microsecond interval reserved for transmitting update or increased detail information.

For the luminance signal, compensation for data lost by dropping of alternate lines is partially achieved by applying the ottput of low pass filter 56 to a line differential generator 58 via the above-mentioned frame store in decimator stage 62. The line differential signal has a value corresponding to the difference between a linearly interpolated value of the two adjacent lines and the actual present line value in accordance with the equation:

$$LD_n = L_n - (L_{n-1} + L_{n+1})/2$$

Here, n is the line number of the currently-omitted line, while n−1 and n+1 represent the previous line and the next line, respectively.

Reference to FIG. 5 indicates that line differential signals associated with even numbered lines are to be transmitted when these lines are omitted in the luminance signal and vice versa. The output of line differential generator 58 is thus applied to a 2:1 decimating stage 60 which selects line differential signals stored at the output of stage 58 in phase opposition with the luminance lines selected for transmission, i.e. LD signals associated with even lines will be transmitted on the same lines as luminance data for odd numbered lines and vice versa.

The LD signals at the output of decimator unit 60 have a bandwidth of 4.2 MHz and a time duration of 26 microseconds. They are applied to a selector unit 80 which will be described in greater detail below. However, its function is to select the incoming LD signals for inclusion in the lines of the first two frames and to select horizontal detail data Yh for the third frame and additional detail for the chrominance components in the fourth frame.

The Yh signal is derived from the output of the high pass filter 54 by heterodyning as will be explained in greater detail with reference to FIG. 8. Here the heterodyning is used to create a signal within the proper bandwidth of the transmission system.

Referring now to FIG. 8, the output of the 11.2 MHz high pass filter is illustrated at A and this is assumed to extend from 11.2 MHz to 15 MHz. The difference component created by heterodyning with 10.74 MHz, has a lower end at 11.2−10.74=0.46 MHz, while the higher end is at 15−10.74=4.26 MHz. The sum component created by heterodyning extends from 22 MHz to 26.2 MHz and will be filtered by a channel bandwidth limiting filter prior to transmission. The two bands created by the heterodyning process are illustrated at B in FIG. 8.

The time duration of the active line is still equal to 26 microseconds. At this point the signals of heterodyned Yh are of the same format as the above described LD signal. Both are 26 microseconds in length; both have bandwidths of 4.2 MHz; bot represent an improvement in resolution, horizontal nnd vertical, respectively. For both of these signals, therefore, a time compression of 1:2 is still required to allow them to fit into the allocated 13 microsecond slot.

Figure 9:
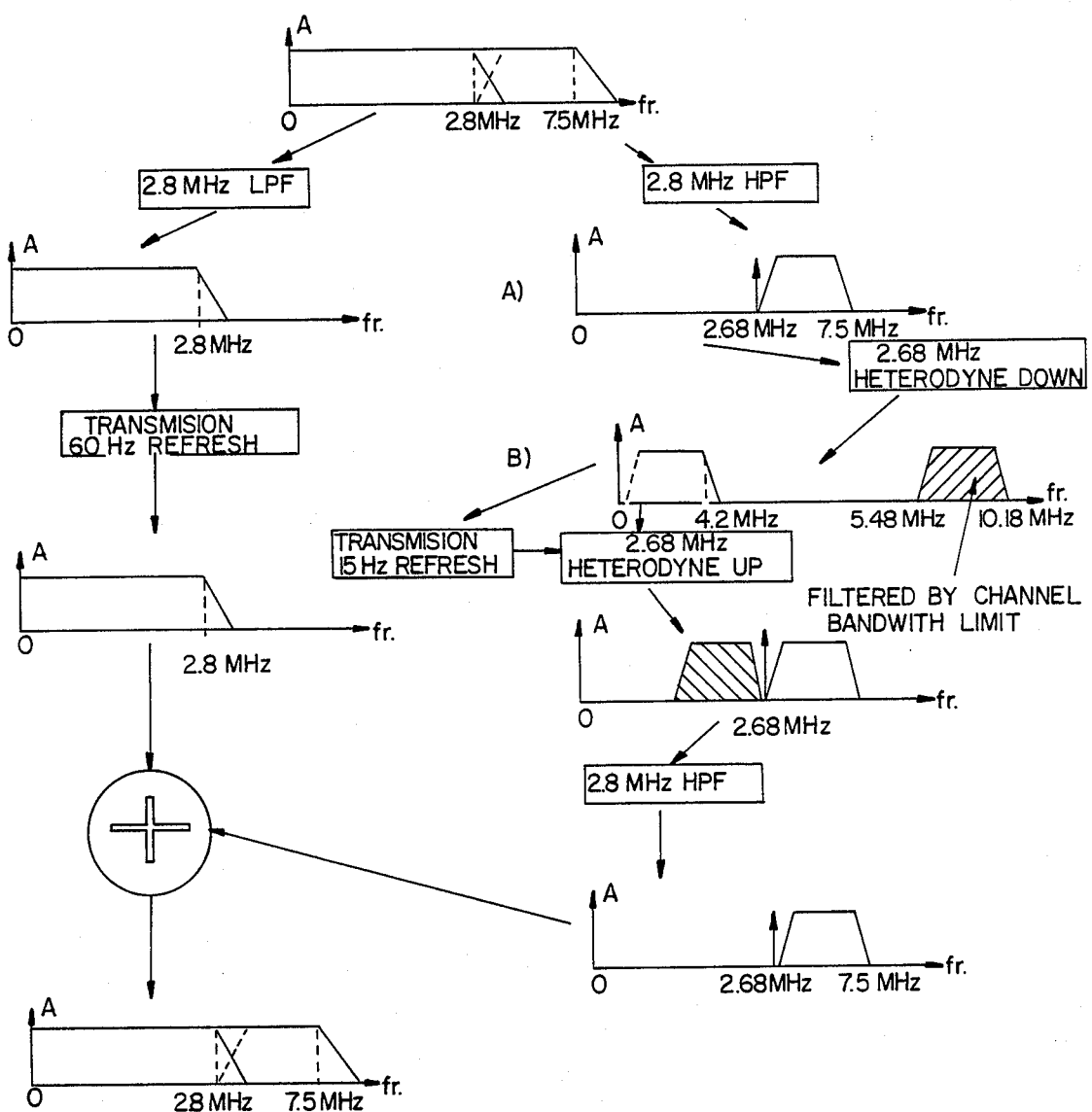
FIG. 9 is a diagram illustrating heterodyning of the high frequency chrominance components.

Finally, signals Uh and Vh must be generated. These are derived from the output of a high pass filter 72 whose input is directly connected to stage 62. The output of this filter is illustrated at A in FIG. 9. It has a frequency spectrum extending from 2.68 MHz to 6.9 MHz, since the chrominance signlls have a bandwidth only extending up to 6.9 MHz.

This signal is heterodyned with a 2.68 MHz signal. Again, the sum and difference signals form two bands. The lower band is limited to approximately 4.2 MHz. The upper band will be removed by the system output filter. The time duration of each of these signals is 26 microseconds. They are thus of the same format as the other signals applied to selector stage 80. The heterodyned signals are subjected to line sequence decimation in a stage 79, so that Uh and Vh alternate when applied to selector stage 80.

The LD signals, the Yh signals after heterodyning, a the Uh, Vh signals also after heterodyning are all applied, as mentioned before, to selector stage 80. Here the selection is carried out to achieve the pattern illustrated in FIG. 5. IN the first two frames LD signals are inserted, the third frame receives the Yh signal, while frame 4 receives the Uh and Vh signals on alternate lines. Again, the Uh and Vh components are tied in phase to the V/U components so that the high frequency data is furnished in those lines which omit the related chrominance component.

The lines selected by selector stage 80 are subjected to a 2:1 compression in stage 84. Following compression, each of the signals has a 13 microsecond time duration and an 8.4 MHz bandwidth. These enhancement signals can thus be combined directly with the luminance and chrominance signals previously discussed as applied to the input of output stage 66. The signal to be transmitted must of course also include synchronization signals, timing signals to restore the U, V signals, and a pilot for the up-heterodyning process in the decoder, etc.

The digital sound signal after encoding with any of the existing DPCM techniques, is readily added to the signal in the remaining 5 microseconds in each line.

The signal at the output of the encoder thus has the required format for transmission.

Figure 10:
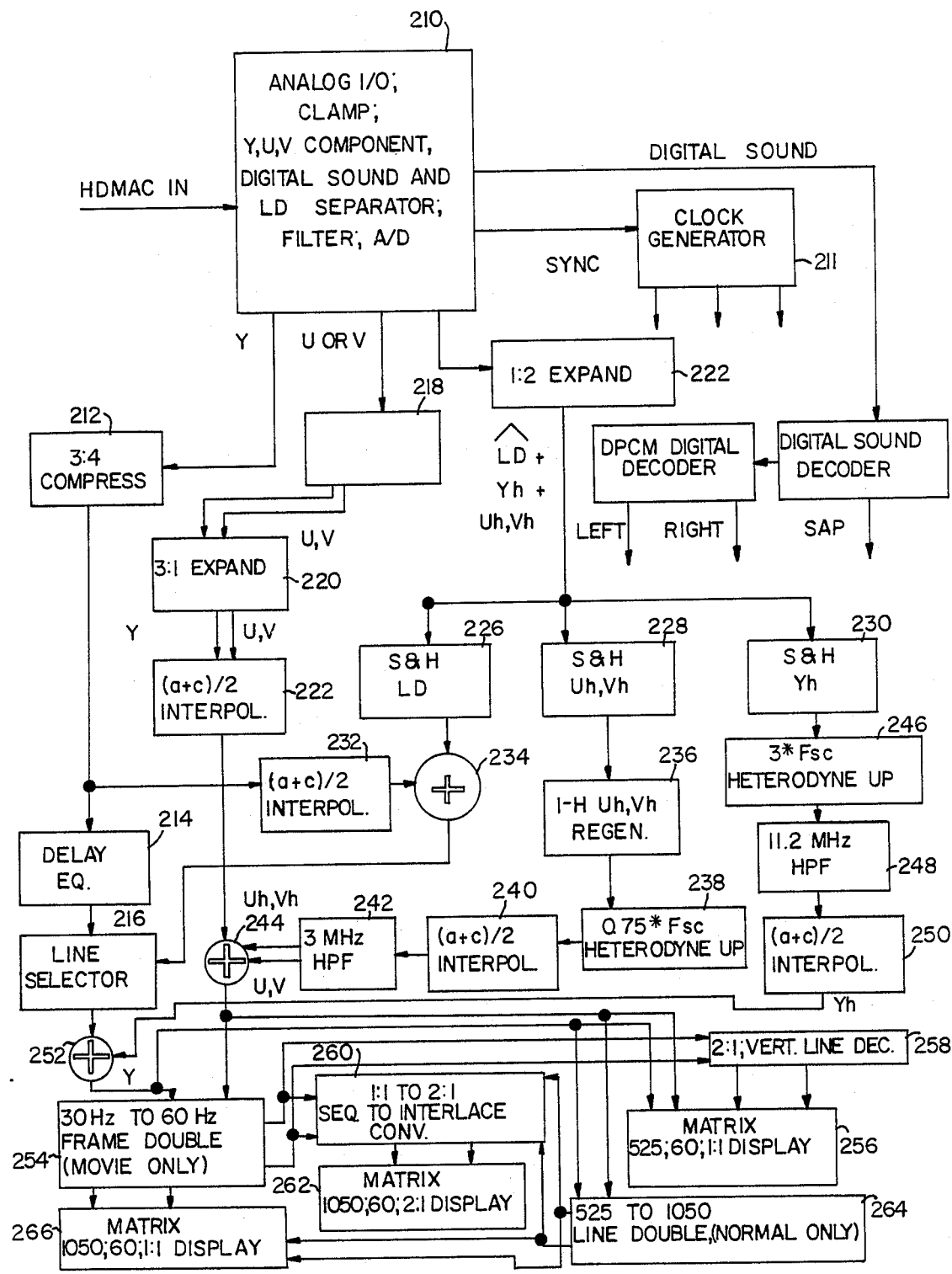
FIG. 10 is a block diagram illustrating the HDMAC decoder at the receiving end.

At the receiver, the output of the satellite dish is applied to a HDMAC decoder 30, shown in greater detail in FIG. 10.

In FIG. 10, the HDMAC received is applied to an input stage 210 which separates the Y, U, V components, the digital sound and the LD data. It further carries out an analog/digital conversion.

The luminance signal is applied to a 3:4 compression circuit 212 whose output is connected through a delay equalizer 214 to a line selector 216.

Figure 12:
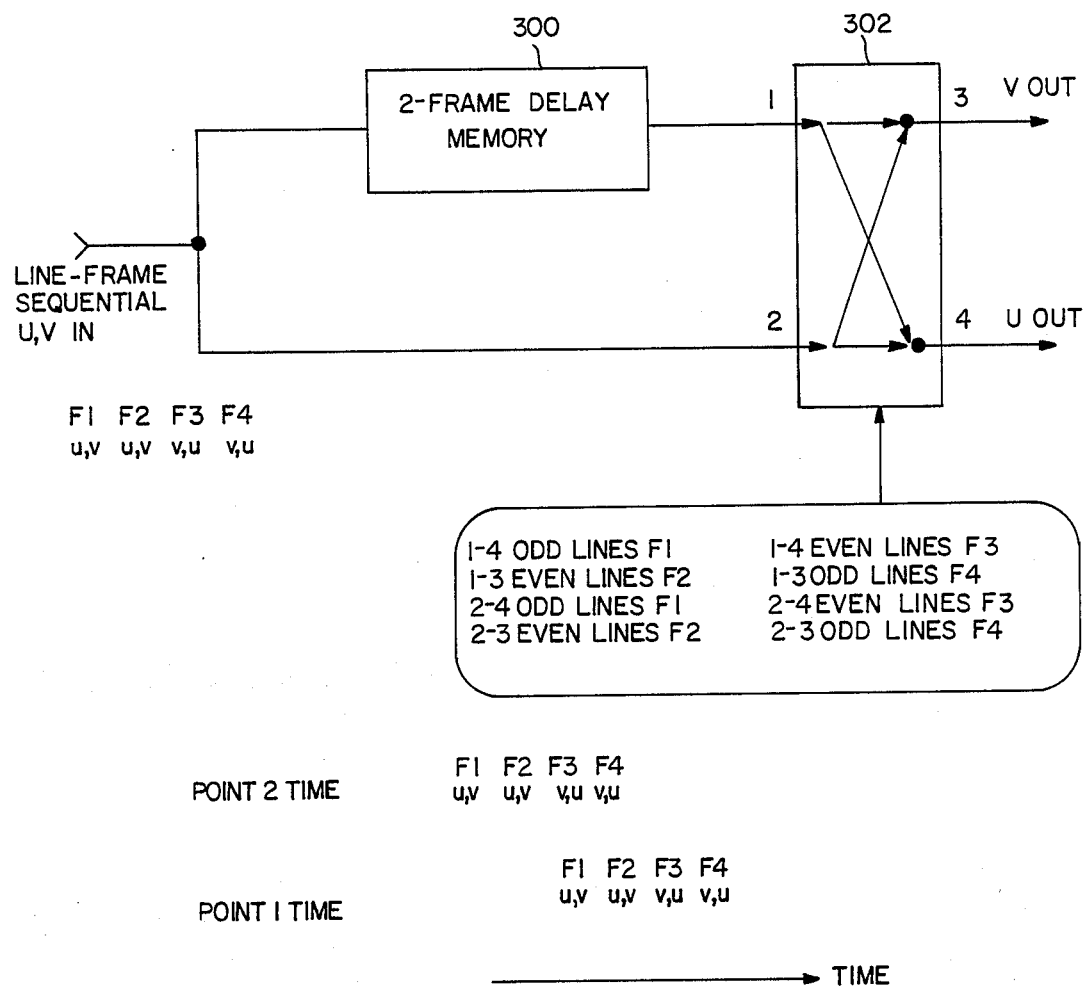
FIG. 12 is a switching diagram illustrating the U, V signal regenerator at the receiving end.

The chrominance components at the output of input stage 210 are applied to a U, V regeneration stage 218, shown in greater detail in FIG. 12. The output of this stage is subjected to a 3:1 expansion in a stage 220. The expanded U, V components are subjected to interpolation in the stage 222. This interpolation is similar to that for the line differential interpolation in the luminance component and is readily carried out on a digital basis. The compression by a 3:4 ratio of the luminance component in addition to the above-mentioned expansion of the chrominance component, brings both components back to the original time scale.

LD data at the output of input stage 210 is subjected to a 1:2 expansion in an expansion stage 224. The same is true for Yh and the Uh, Vh components.

The LD components at the output of expansion unit 224 are applied to a sample-and-hold circuit 226, while expanded data Uh, Vh and Yh are stored in sample-and-hold circuits 228, 230 respectively. The output of sample-and-hold circuit 224 is combined in an adder circuit with the output of an interpolator 232 which interpolates the output of compression stage 212. The output of summing circuit 234 is connected to second input of line selector 216.

The output of sample-and-hold circuit 228 is applied to a Uh, Vh regenerating stage 236. The output of stage 236 is heterodyned in heterodyne stage 238, interpolated in a interpolation stage 240, subjected to high pass filtering in a 2.8 MHz high pass filter stage 242 in a summing circuit 244.

The output of sample-and-hold stage 230 is heterodyned in a heterodyne stage 246, subjected to high pass filtering in a high pass filter stage 248. The output of stage 248 is interpolated in an interpolation stage 250 and combined with the output of lines selector 216 in a summing stage 252. The output of summing stage 252 is applied to one input of a frame doubling stage 254 which operates only for telecine inputs. It is also applied to one input of an output matrix 256. A second input for output matrix 256 is derived from the output of a summing circuit 244. The output of summing circuit 244 is also applied to a second input of frame doubling stage 254. The output of frame doubling stage 254 is also applied to a 2:1 vertical line reducing stgge 258. The output of this stage is applied to further inputs of output matrix 256.

The output of frame doubling stage 254 is also applied to a sequential-to-interlace converter 260. The output of converter 260 is applied to a matrix 262.

In the case of a television rather than a telecine input, the output of summing circuit 244 as well as the output of summing circuit 252 are applied to a line doubling circuit 264. Output of line doubling circuit 264 is applied to the sequential-to-interlace converter 260 as well as to a further matrix 266.

An output with a format of 1050; 60; 1:1 is available at matrix 266. The format 525; 60; 1:1 is available at the output of matrix 256, while a 1050, 60, 2:1 format output is available from matrix 262.

The above-described system operates as folloss:

The front end of the decoder is a standard analog video front end 210 where the HDMAC signal is clamped, converted to baseband, the Y, U, V components, digital sound and LD signals are stripped and an analog-to-digital conversion is carried out. The sync signals are applied to a clock generator 211.

The Y component is compressed by a factor of 4:3 in a compression stage 212, thereby restoring its original 26 microsecond length from the received 34 microsecond length, and the original bandwidth of 11.2 MHz. The LD component is expanded to the standard 26 microsecond length in stage 224. Sample-and-hold circuit 224 then makes this signal available as required for processing.

The luminance signals at the output of stage of 212 contain only one-half the required number of lines per frame. The missing lines now have to be restored. Since $$LDn = Ln - (Ln-1 + Ln+1)/2$$

then $$Ln = LDn + (Ln-1 + Ln+1)/2$$

The addend in the last equation is calculated in stage 232, which is a simple digital adder and shift circuit. This value is then added to the corresponding LD value in summing stage 234. The output of summing stage 234 is thus a reconstituted missing line of luminance values. Line selector 216 then alternately selects a received Y component line at the output of expansion saage 212 and a reconstituted line at the output of summing stage 234 to generate a sequential scan signal having the full complement of luminance line information.

The U and V components are stripped as illustrated in FIG. 12. Specifically, for each line, a U and V component is to be furnished simultaneously. The components to be utilized are corresponding components on the same line in sequential frames having the same line. For example, referring to FIG. 5, odd numbered lines in F1 correspond to odd numbered lines in F3. Even numbered lines in F2 corresponding to the same numbered lines in F4, etc. Thus the received HDMAC signal, after stripping of the synchronization components, is applied to the circuit shown in FIG. 12. It comprises a two frame delay memory 300 into which the U, V signals are entered simultaneously with their application to a terminal 2. Read-out from two frame delay memory 300 then takes place in synchronism with the received signals applied to terminal 2. For example, line 1 of F1 is read out in synchronism with the receipt of line 1 of F3. A switch 302 is provided. This, too, operates in synchronism with the receipt of the U, V signals. The signal at terminal 1 is therefore delayed by two frames relative to that at terminal 2. The required switch connections are as follows:

Terminal 1 is connected to terminal 4 during the odd numbered lines of F1, i.e. the U signal is furnished at terminal 4. Simultaneously, the odd lines of field 3 are connected from terminal 2 to terminal 3 causing the V component to be available there. During frame 1, lines 1, 5, 9, etc. are connected from terminal 1 to terminal 4 and terminal 2 to terminal 3. For the duration of the even lines, namely lines 3, 7, 11, etc. switch 302 connects terminal 2 to terminal 4 and terminal 1 to terminal 3.

In frame 2, in terms of lines present in the frame, lines 2, 6, 10, are considered odd numbered while lines 4, 8, 12 etc. are considered even numbered. With this convention, during the odd lines of fields 1 and 2, terminal 1 is connected to terminal 4 and terminal 2 is connected to terminal 3. During the even lines of fields 1 and 2, terminal 1 is connected to terminal 3 and terminal 2 is connected to terminal 4. During the odd lines of field 3 and field 4, terminal 1 is connected to terminal 3, since the V component now leads the U component. During the even lines of F3, F4, terminal 1 is connected to terminal 4 and terminal 2 is connected to terminal 3. The phase thus alternates with alternate pairs of fields.

The received Yh signal is held in sample-and-hold circuit 230. (It should be noted that expansion circuit 224 is representative of four individual expansion circuits, one for LD, one for Yh and one each for Uh, Vh. The individual expansion circuits are then connected to corresponding ones of sample and hold circuits 226, 228 and 230. Alternatively, all of the above-mentioned signals can be expanded in the same unit and the output of stage 224 applied to a distributor circuit which distributes the signals to the appropriate sample-and-hold or regeneration circuit under control of timing signals derived from clock generator 211.) The values of Yh are maintained in sample-and-hold circuit 230 for three frames, until the next set of line values becomes available. Sample-and-hold circuit 230 contains a frame memory.

Yh values read out from sample-and-hold circuit 230 are heterodyned upwards using the pilot signal derived from front end 210. This pilot signal has the exact phase and frequency of the corresponding heterodyning signal at the encoder. The 0–4.2 MHz Yh signal from front end 210 is heterodyned upwards generating a sum component having a bandwidth of 10.74 MHz to 15 MHz and a difference side band extending from 10.74 MHz to 6.54 MHz. The lower side band is removed by filtering with an 11.2 MHz high pass filter in stage 248. Information is read out from sample-and-hold circuit 230 during each frame. However, this yields only 262.5 lines per frame. 262 lines are therefore stored in a memory 149 connected to the output of stage 148. With data derived from memory 249 interpolation stage 250 carries out an interpolation which, for each value on a given line, obtains the average of the corresponding value on the previous and next following line. By alternately reading Yh from memory 249 and interpolation stage 250, 525 lines of Yh can be obtained at the output of combining stage 251. The signals also have a 26 microsecond duration and can therefore be directly added to the luminance signals at the output of line selector 216.

Figure 13:
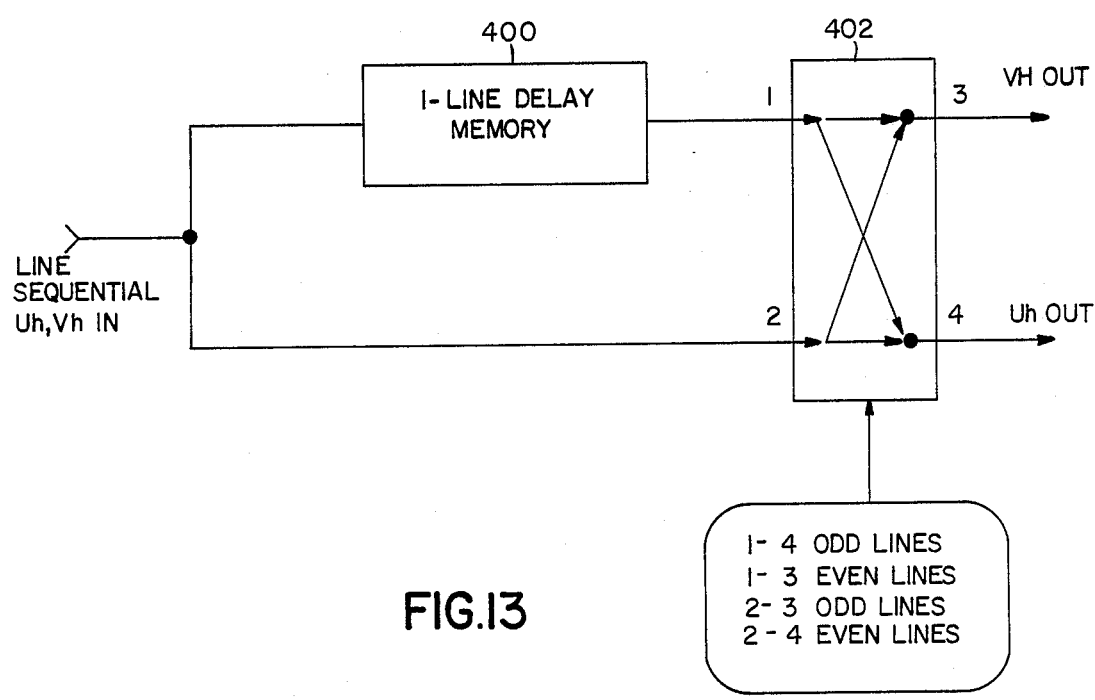
FIG. 13 is a switching diagram illustrating the Uh, Vh signal regenerator at the receiving end.

The Uh and Vh components are derived from the output signal of stage 224 as illustrated in FIG. 13. The operation is similar to that of the U, V regeneration shown in FIG. 12 except that a one line delay memory 400 and a switch 402 are used and will not be described further. Uh and Vh are thus available simultaneously at the output of regenerating stage 236. Both components are heterodyned upwards in heterodyne stage 23B, this being similar to the process described with respect to heterodyne stage 246. Uh and Vh information at the rate of 262.5 lines per frame, of the correct time duration and bndwidth is available at the output of heterodyne stage 238. An interpolation similar to that discussed with respect to interpolation stage 250 is carried out in interpolation stage 240 for the Uh and Vh components individually. The unwanted side band created by the heterodyning process is then removed in a 3 MHz high pass filter 242. Uh and Vh information at the rate of 525 lines per frame is thus available at the second input of summing stage 244. Since the other input of summing stage 244 receives the U and V signals, each Uh signal is combined with its corresponding U signal, and each Vh signal is combined with its corresponding Vh signal so that at the output of summing or combining stage 244 both chrominance components are available with the appropriate bandwidth and time duration.

Luminance output from combining stage 252 and the chrominance output from combining stage 244 are then both applied to the relevant matrices to generate the desired display signals. If the display is to have the 525; 60; 1:1; 16/9 format, the Y, U and V signals are applied to matrix 256 which merely converts the U and V components to RGB signals, all other parameters already being appropriate.

If the display is to have a 1050; 60; 1:1; 16/9 format, as may be desirable for displays larger than 120 inches, the Y, U and V signals are applied to stage 264 which doubles the number of lines, for example by interpolation such as discussed in relation to stage 250. Following the line doubling, the U and V signals are applied to a matrix similar to the matrix 256 so that the RGB components are derived for display in this format.

If the desired display has the format 1050; 60; 22:1; 16/9, i.e. if an interlaced rather than a progressive scan display is desired, the signals at the output of stage 264 are applied to a sequential-to-interlace converter 260. The output of this converter, which is a standard converter whose detailed operation is not essential to an understanding of the present invention, is applied to matrix 262 to convert the U and V components to RGB signals.

Finally, if the input to the encoder at the transmitting end was a telecine input, and this has been signalled to the decoder, then the U, V and Y signals are applied to a frame doubling circuit 254 so that the frame rate is changed from 30 (29.94) Hz to 60 (59.94) Hz. The output of circuit 254 is then similar to the combined Y, U, and V outputs whose processing was discussed above. A telecine signal can thus be viewed in as many formats as were available for the television signal input.

Figure 11:
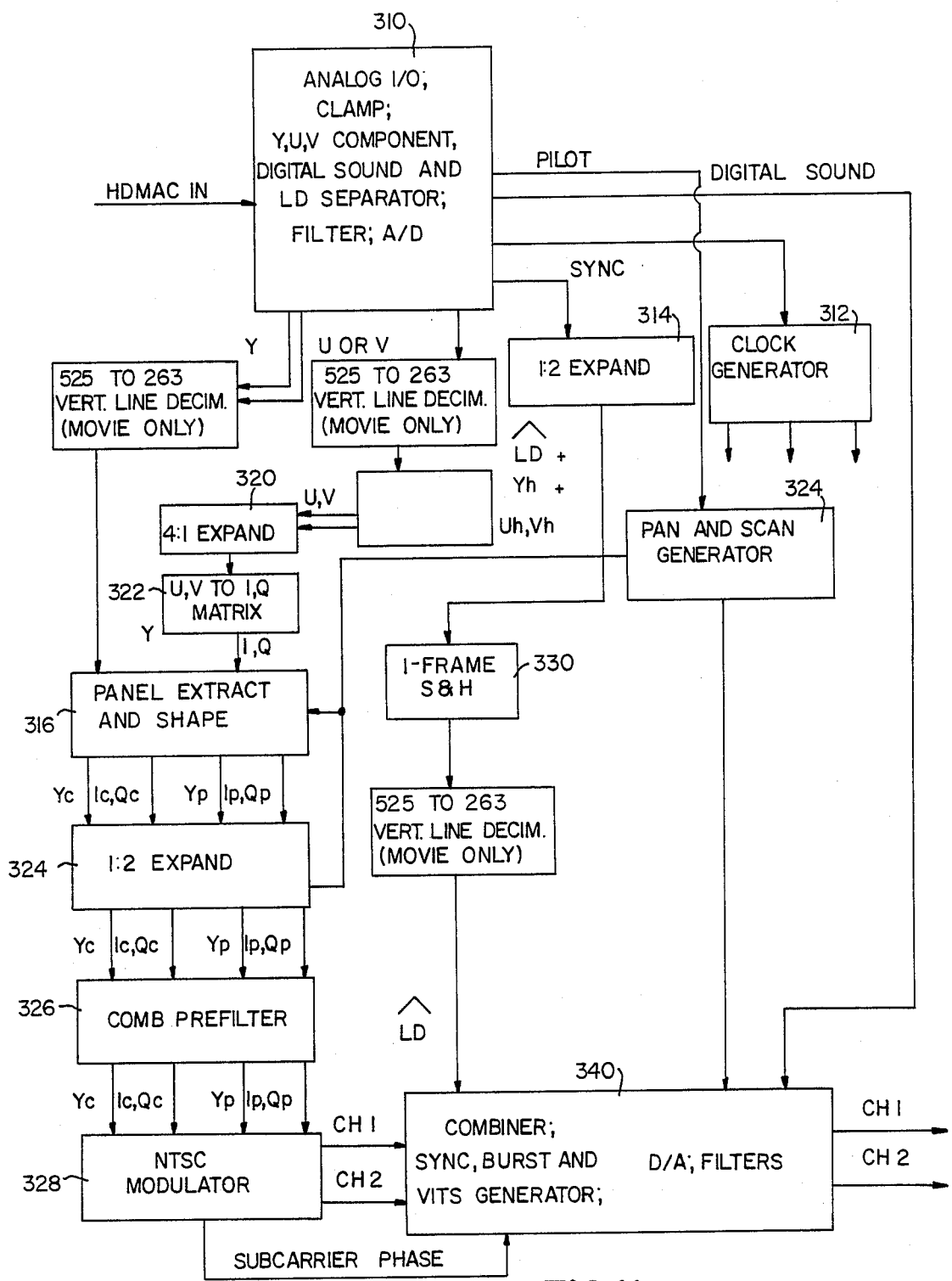
FIG. 11 is a block diagram of the HDMAC to two-channel encoder at the receiving end.

The circuit for the HDMAC to two-channel encoder is shown in FIG. 11. In this figure, 310 denotes the front end which is in most respects similar to the front end shown in the decoder of FIG. 10. The Y, U, V components are separated as is digital sound and the LD data. The signals are filtered and converted to digital form. Again, sync signals aee applied to a clock generator 312. When the incoming HDMAC signal is a television signal, the luminance component Y is applied directly to a panel extract and shape circuit 316. This circuit is the same as the one in the cross-referenced application and will therefore not be described in detail.

The U and V signals are applied directly to a U, V regeneration stage 318 which is identical to that illustrated in FIG. 12 if television signals are concerned. For a telecine input, the U, V signals are first applied to a line decimator stage 311. The U, V signals at the output of stage 318 are applied to a 4:1 expansion circuit 320 whose output is applied to a standard U, V to I, Q matrix 322. The I, Q signals at the output of matrix 322 are applied to the panel extract and shape circuit 316. This circuit operates under the control of pan-and-scan generator 324. This generator is commercially available as an option to telecine manufactured by Rank and Cintel. It will therefore not be described in detail herein.

A 1:2 expansion circuit 324, a comb filter 36, and an NTSC modulator 328 are all described in the cross-referenced co-pending application and, will therefore not be described herein.

LD data, Yh data and Uh, Vh data is subjected to 1:2 expansion in an expansion stage 314. The output of stage 314 is connected to four circuits, here incorporated in sample-and-hold circuit 330. Circuit 330 thus signifies the LD and Yh extraction circuit as well as the Uh, Vh regenerating circuits already discussed with reference to the HDMAC decoder. The output of stage 330 is applied directly to the final output stage 340 if television signals are concerned. For a telecine input, the U, V signals are first applied to a line decimator stage 311. In the output stage all the necessary signals for generating the final display are combined properly. Again, this is described in the copending application and is not discussed in detail here. Digital-analog conversion and filtering then gives the two outputs illustrated also in FIG. 1. Channel 1 is receivable by a standard NTSC receiver, while a two-channel NTSC receiver combines channels 1 and 2 to give a high definition television signal.

If the received signal is a telecine signal, each frame is decimated by a factor of 2, i.e. only 263 lines remain per frame. However, the frame rate is doubled so that the 59.94 standard NTSC frame rate is again reconstituted.

It is clear from the above description o the operation of the transmission system of the present invention, that a one channel satellite system can be utilized to transmit high definition television signals in any one of a number of desired formats. No vertical luminance information is lost. The horizontal luminance and chrominance resolution is decreased only in the case of moving objects, the case in which it is least visible to the human eye.

Although the invention has been disclosed in particular embodiments, many variations and modifications thereof will be readily apparent to one skilled in the art and are intended to be encompassed in the following claims.

I claim:

1. Method for transmitting a high definition television signal having a predetermined number of lines per frame, a predetermined number of frames per second, a predetermined scanning pattern, a first predetermined bandwidth, a luminance component, a first chrominance component and a second chrominance component over a single channel having an assigned channel bandwidth less than said first predetermined bandwidth to a receiving location, comprising the steps of encoding said high definition television signal to create an HDMAC signal having said predetermined number of frames per second, two sequential frames forming a pair, and half said predetermined number of HDMAC lines per frame, each of said HDMAC lines having a plurality of time intervals, said plurality of time intervals comprising a first and a second time interval assigned to said luminance and said chrominance signals, respectively, and a third time interval for update signals comprising line difference signals during a first predetermined fraction of said predetermined number of frames per second, high frequency luminance signals during a second fraction of said predetermined number of frames per second, and high frequency chrominance signals during a third fraction of said predetermined number of frames per second, thereby creating said HD MAC signal;

filtering said HDMAC signal to said assigned channel bandwidth, thereby creating a filtered HDMAC signal; and transmitting said filtered HD MAC signal to said receiving location.

2. A method as set forth in claim 1, wherein said two sequential frames of a pair comprise a first frame having odd numbered lines and a second frame having even numbered lines; wherein each of said lines has a predetermined number of pixels and wherein said line difference signals comprise, for each of said pixels:

$$LD_n = L_n - (L_{n-1} + L_{n+1})/2$$

where n is the number of the line to be omitted, and n−1 and n+1 are the vertically adjacent previous and vertically adjacent next line, respectively.

3. A method as set forth in claim 2, wherein line difference signals for n equal an even number are transmitted during selected ones of said first frames and line difference signals for n equal an odd number are transmitted during said second frames of selected ones of said pairs.

4. A method as set forth in claim 3, wherein said selected ones of said pairs comprise alternate ones of said pairs.

5. A method as set forth in claim 3, wherein said encoding step further comprises the step of time expanding said luminance signal to fit said first time interval in each of said lines.

6. A method as set forth in claim 5, further comprising the step of time compressing said line difference signals, said high frequency luminance signals and said high frequency chrominance signal prior to said filtering.

7. A method as set for in claim 2, wherein said chrominance signals include a first and a second chrominance signal; and wherein said encoding further comprises selecting said first chrominance signal for alternate lines in each of said frames and said second chrominance signal for the remaining ones of said lines in each of said frames.

8. A method as set forth in claim 1, further comprising the steps of, at said receiving location, receiving said filtered HDMAC signal and decoding said HDMAC signal to generate said high definition television signal; and displaying said high definition television signal.

9. A method as set forth in claim 8, wherein said step of decoding said HDMAC signal further comprises decoding said HDMAC signal to generate a first channel signal and a second channel signal, said first channel and second channel signals respectively constituting an NTSC signal and a second channel signal constituting an augmentation signal; and displaying said NTSC signal, and combining said first channel signal and said second channel signal to generate said high definition television signal.

10. Apparatus for encoding a high definition television signal having a predetermined number of lines per frame, each line having a predetermined line period, a predetermined number of frames per second, a predetermined scanning pattern, a first predetermined bandwidth, a luminance signal, a first chrominance signal, and a second chrominance signal, for transmission over a single channel having an assigned channel bandwidth less than said first predetermined bandwidth, comprising means for combining at least selected ones of said luminance signals with at least one vertically adjacent luminance signal, thereby creating line difference signals; and selection means for selecting luminance, and first and second chrominance signals associated with odd numbered lines and line difference signals associated with even numbered lines during alternate ones of said frames, the so-selected signals constituting first selected signals, and for selecting luminance and first and second chrominance signals associated with even numbered lines and line difference signals associated with odd numbered lines during the remaining ones of said frames, thereby creating second selected signals;

means for generating first time multiplexed line signals having said first selected signals in predetermined time intervals thereof during said alternate ones of said frames, and for generating second time-multiplexed line signals having said second selected signals in predetermined time intervals thereof during said remaining ones of said frames;

further comprising low pass filter means for filtering said luminance signal and applying a low frequency luminance signal to said combining means;

high pass filter means for filtering said luminance signal and generating a high frequency luminance signal, first heterodyning means for heterodyning said high frequency luminance signal thereby generating difference luminance signals in a predetermined low frequency range and sum luminance signals outside of said assigned channel bandwidth; wherein said selection means further comprises means for substituting said difference luminance signals for said line difference signals in selected ones of said frames; and further comprising second high pass filter means and second low pass filter means for, respectively, filtering said first and second chrominance signal and generating, respectively, first and second high frequency and first and second low frequency chrominance signals, second heterodyning means for heterodyning said high frequency first and high frequency second chrominance signals to generate heterodyned first and heterodyned second chrominance signals and applying said heterodyned first and heterodyned second chrominance signals to said selection means; and wherein said selection means substitutes said heterodyned first and heterodyned second chrominance signals for said line difference signals in every fourth one of said frames.

11. Apparatus as set forth in claim 10, further comprising line sequence decimator means connected to said second heterodyning means for selecting said first high frequency chrominance signal and said second high frequency chrominance signal alternately on sequential lines, thereby creating selected first high frequency chrominance signals and selected second high frequency chrominance signals, and means for applying said selected first high frequency chrominance signals and said selected second high frequency chrominance signals to said selection means.

* * * * *